G. PORTER.
SAFETY DEVICE FOR CARS OR THE LIKE.
APPLICATION FILED FEB. 18, 1911.
993,871.
Patented May 30, 1911.
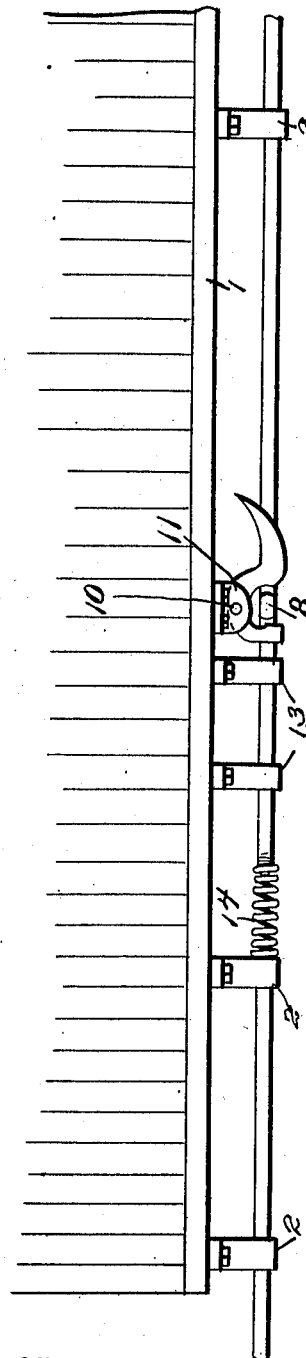
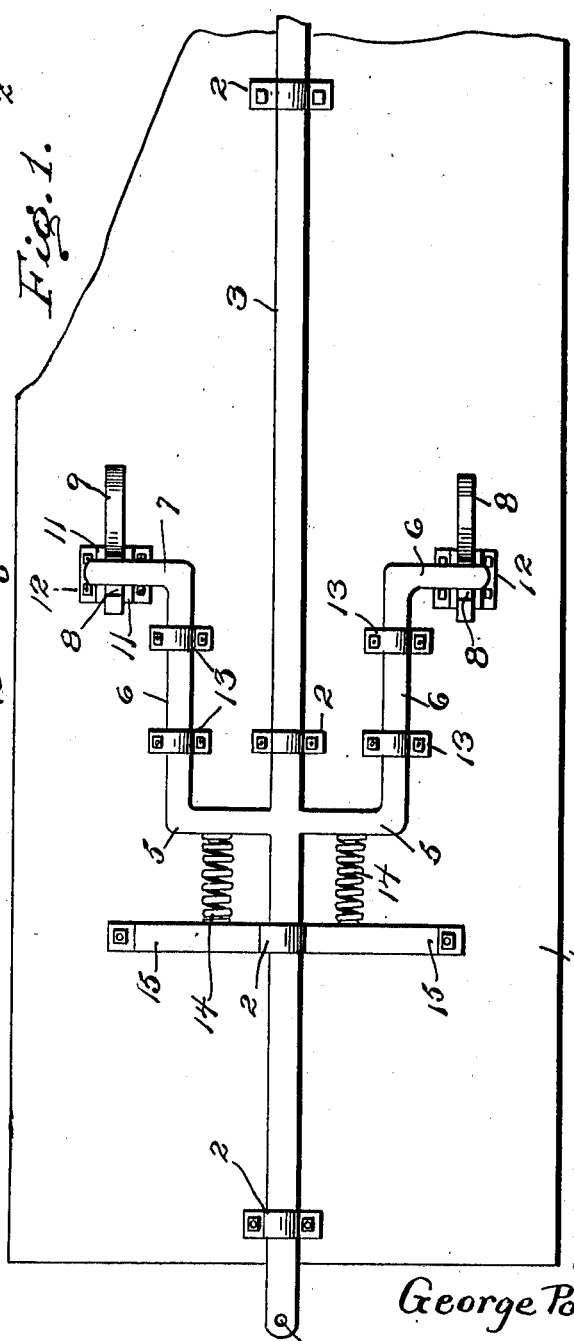
Witnesses
Edna W. Thomas
Chas. C. Richardson
Inventor
George Porter.
By Wm. C. W. McIntire
Attorney

UNITED STATES PATENT OFFICE.

GEORGE PORTER, OF CENTERVILLE, ALABAMA.

SAFETY DEVICE FOR CARS OR THE LIKE.

993,871. Specification of Letters Patent. Patented May 30, 1911.

Application filed February 18, 1911. Serial No. 609,520.

*To all whom it may concern:*

Be it known that I, GEORGE PORTER, a citizen of the United States, residing at Centerville, in the county of Bibb and State of Alabama, have invented certain new and useful Improvements in Safety Devices for Cars or the Like; and I do hereby declare the following to be a full, clear, and exact description of the invention, such as will enable others skilled in the art to which it appertains to make and use the same.

This invention relates to new and useful improvements in safety devices for cars or the like.

An object of this invention is the provision of a device of this character so constructed and connected to the several cars composed in a train section that when anything retards the movement of one of the front cars, the device will serve to act as a brake upon each of the cars in the rear of the car to which the accident happens and stop the train without danger of injury to the passengers thereon.

Another object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more particularly described, claimed and illustrated in the accompanying drawing, in which—

Figure 1 is a side elevation of a car having my invention applied thereto; and Fig. 2 is a plan view thereof.

Referring to the drawing by characters of reference, the numeral 1 designates a car of any customary construction or type, upon the bottom of which is longitudinally mounted in suitable guides 2 a beam 3, the opposite ends of which project beyond the ends of the car 1, having formed thereon car couplers 4. The substantially intermediate portions of the beam 3 are provided with laterally extending arms 5, the outer terminals of which are bent rearwardly, as at 6, in parallel relation to the beam 1 and then offset outwardly at right angles thereto, as indicated at 7, for the engagement with a groove 8 formed in the upper edge of a brake shoe 9 pivoted, as indicated at 10, between depending ears 11, formed upon plates 12, bolted, or otherwise secured, to the bottom of the car 1. The rearwardly extending portions 6 of the arms 5 are mounted in suitable guides 13, and have secured to their forward edges coil springs 14, the opposite ends of which are secured to extensions 15, formed by extending the opposite ends of one of the guides 2.

From the foregoing description it will be readily apparent that when one of the cars is hindered by the same coming in contact with any object which happens to be upon the track, or by the breaking of a wheel or the derailment of the train, the beam 3 will be moved rearwardly in the guides 2, causing the extensions 7 of the arms 5 to move rearwardly against one of the sides of the groove 8, forcing the lower terminal of the brake shoe 9 downwardly and into engagement with the ties of the track, obviously stopping the rear cars and preventing any accident thereto.

Having thus fully described this invention, what I claim as new and desire to secure by Letters Patent is:

The combination with a car of a beam slidably mounted longitudinally thereon, laterally extending arms formed upon the said beam, opposite extensions formed upon these arms in substantially parallel relation to the beam, lateral projections formed upon the ends of these arms for engagement with the brake shoes, guides connecting the beam and parallel extensions formed upon the laterally extending arms to the car, the said beam adapted, upon its rearward movement, to operate the brake shoes for the purpose of retarding the motion of the train, and springs connected to the said laterally extending arms for the purpose of returning the shoes to their normal positions, substantially as and for the purposes described.

In testimony whereof I affix my signature in presence of two witnesses.

GEORGE PORTER.

Witnesses:
D. W. CRAWFORD,
GEO. HILL.

Copies of this patent may be obtained for five cents each, by addressing the "Commissioner of Patents, Washington, D. C."